April 3, 1934.  J. H. COHEN  1,953,289
FILTER
Filed March 13, 1931
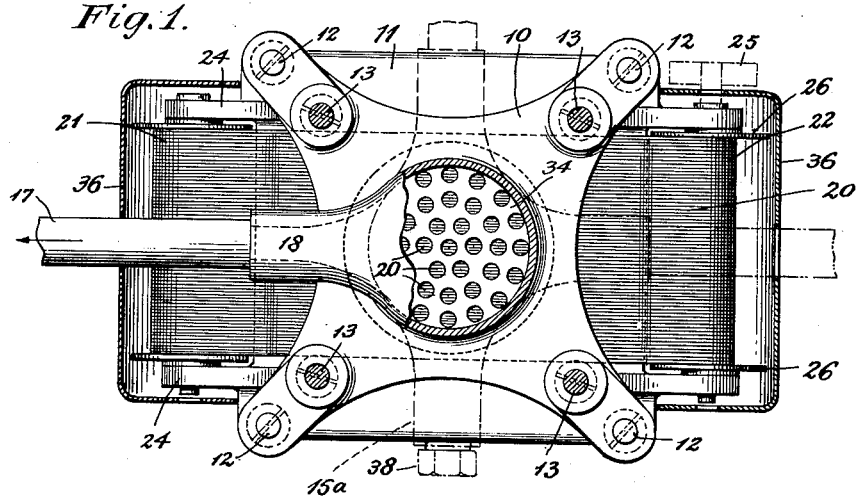
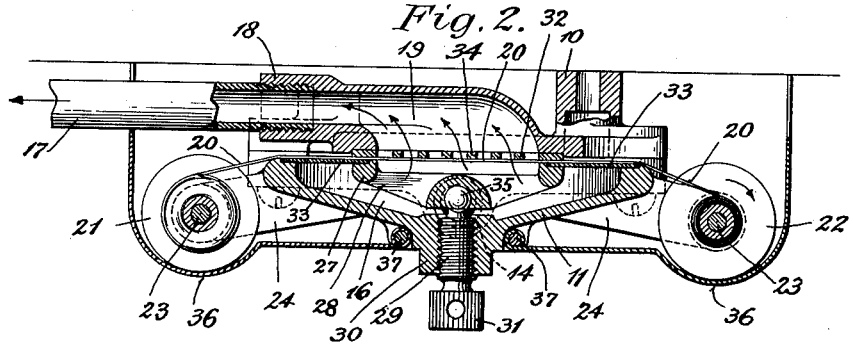
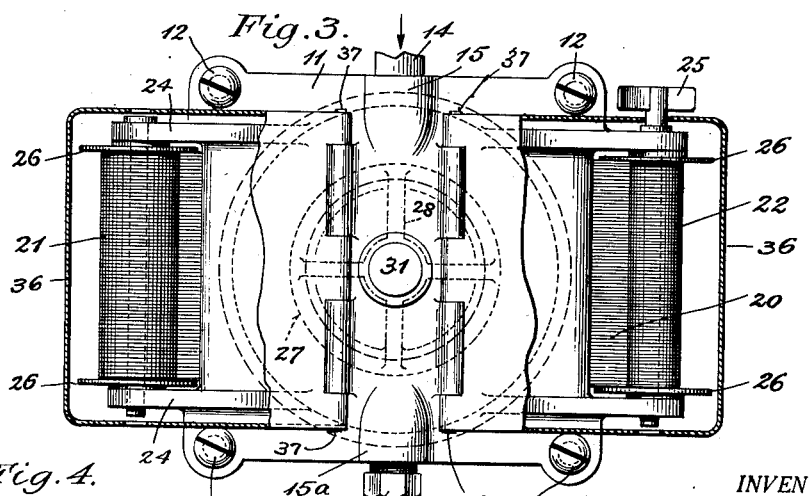
INVENTOR.
Joseph H. Cohen,
BY
ATTORNEY Patented Apr. 3, 1934

1,953,289

UNITED STATES PATENT OFFICE 1,953,289

FILTER

Joseph H. Cohen, Bridgeport, Conn.

Application March 13, 1931, Serial No. 522,464

11 Claims. (Cl. 210—196)

This invention relates to filters, and more particularly, to a device for filtering oil circulated in an internal combustion engine.

Heretofore oil filters have been proposed and used involving pads of cellular material through which the oil is pumped and which arrest and retain particles of foreign matter. But, with these devices, in which the pads are contained in a can or casing, it is necessary to disassemble the device to substitute new fillers for those which have been in use for some time. In some constructions replacement of the filler pads is not possible and it is necessary to replace the complete unit after it has been in use only a short time, which is, of course, very costly.

An object of this invention is to provide a filter in which the strainer or foreign matter arresting substance may be renewed with such ease and expedience that the owner or driver of the motor vehicle will not be inimical to performing the operation frequently.

Another object of this invention is to provide a filter which is simple in construction and economical to manufacture while still being efficient in operation.

Other objects and advantages will hereinafter appear.

In the accompanying drawing which illustrates one form of this invention, that at present preferred—

Figure 1 is a back view of the filter of the present invention, with the outlet fitting partly broken away.

Fig. 2 is a horizontal sectional view taken approximately through the center of the device.

Fig. 3 is a front view with the part of the covering or protective casing broken away to show underlying parts.

Fig. 4 is a detail of one form of filter band which may be used with the device of this invention.

The filter of the present invention may be used in any fluid system where it is desired to intercept and trap particles of foreign matter, and the embodiment of the invention herein shown is particularly adapted for use in the oil system of an internal combustion engine.

In the form shown, the filter comprises a frame made of two parts 10 and 11 secured together by bolts 12. The part 10 is provided with holes for screws 13 by means of which the device may be secured to a suitable support such as an engine block not shown.

According to the present invention, the parts 10 and 11 of the frame are each made hollow and communicate with inlet and outlet passages leading to the lubricating oil system, and it is in the passing of the oil from the one part of the frame to the other that the oil is filtered. The inlet and outlet may be connected to either the part 10 or the part 11 of the frame as desired, but as shown, the inlet pipe 14 is threaded or otherwise secured in a socket 15 in the part 11 of the frame and communicating with the socket 15 is a chamber 16.

The outlet pipe 17 is threaded or otherwise secured in a socket 18 in the part 10 and communicates with a chamber 19 in juxtaposition to and preferably in axial alignment with the chamber 16 so that oil may pass from the chamber 16 to the chamber 19.

These chambers, however, are not in direct communication, for interposed between them is a filter 20 which, in accordance with the present invention, may be a strip or band of indefinite length wound on a supply spool 21 and rewound on a receiving spool 22. These spools may be mounted in any suitable way, but as shown they are carried on removable shafts 23 in arms 24 carried by the part 11 of the frame. One of the shafts 23 may have a driving connection with its spool and may have finger-pieces 25 as shown to facilitate the rotation of the receiving spool 22, but this arrangement is not necessary since, as will be pointed out below, the spool may turn by direct manual engagement with the flanges 26 thereon if desired.

To form an oil-tight connection between the chambers 16 and 19 and yet permit the filtering material strip 20 to extend between them, adjacent face portions of the frame parts 10 and 11 are slightly spaced from each other and one of them is provided with a clamping arrangement whereby the space between the two chambers may be securely closed.

For this purpose, the part 11 of the frame in the form of the invention herein illustrated, is provided with a ring 27 having radial arms 28, the center of which has a connection to a screw 29 threaded in a boss 30 on the part 11 of the frame. This screw has a knurled or otherwise suitably formed head 31 by means of which it may be turned to press the filtering strip 20 firmly against a suitable seat 32 on the part 10 of the frame and thereby prevent the escape of oil through the passage for the filtering medium. The ring 27 is connected by a flexible annulus 33 of rubber, metal, or the like, to the outer margin of the chamber 16 so that the ring may have the movement above referred to relative to the walls of the chamber.

The seat 32 may be of any suitable construction but preferably forms part of the plate 34 which is perforated and which supports the filtering strip 20 against being moved inwardly by the pressure of the oil thereon or against being torn apart by the oil passing through the same when the filtering strip is made of a relatively weak substance.

In order that the ring 27 may fit firmly against the seat 32 regardless of minor inaccuracies incident to the manufacture of the parts, the screw 29 is connected to the arms 28 of the ring by a ball and socket joint 35.

The ends and front of the device are closed by covers 36 hinged on rods 37 carried by the part 11 of the device and these covers extend outwardly around the spools as shown in the drawing to keep the unused portion of the filtering strip 20 clean.

In using the device, assuming that it is mounted on the engine block and arranged as shown in Fig. 2, and it is desired to shift the filtering strip 20 while the oil pump is not operated, the screw 29 is loosened to unclamp the filtering strip 20 from between the seat 32 and the ring 27, then the receiving spool 22 is rotated either by means of the finger-piece 25 or by direct manual engagement with the flanges 26 of the receiving spool until the used portion of the strip is moved beyond the perforated plate 34, then the screw 29 is again tightened to clamp the filtering strip 20 in position and prevent the leakage of oil from between the opposed faces of the seat 22 and the ring 27. This simple operation may be performed very quickly and with practically no effort. Therefore it will be seen that with the filter of the present invention, the filtering medium may be and will be more frequently changed than with devices heretofore proposed where the entire device has to be disassembled to remove old and apply new filters.

In operation, foreign particles carried by the oil stream in passing from the chamber 16 to the chamber 19 are arrested by the filtering strip 20 and may fall to the bottom of the chamber 16 which may be flushed out from time to time by removing a plug 38 which closes an opening or socket 15a leading to the chamber.

The sockets 15 and 15a are alike, and the holes which accommodate screws 12 by means of which the parts 10 and 11 are secured together, are symmetrically disposed so that the part 10 is reversible and may be quickly secured to the part 11. If it happens to be assembled in inverted position, it is immaterial, for in either event the plug 38 would close the lower socket while the inlet pipe 14 would be placed in the upper socket.

The position of the part 10 of the device is also capable of being varied. For instance, if it is desired to have the outlet pipe extend to the left as viewed in Figs. 1 and 2, the device is assembled as shown, but if it is desired to have it extend to the right it is merely necessary to secure it to the engine body while extending in that direction, as indicated in dot-and-dash lines in Fig. 1, because of the fact that the holes for the screws 13 by means of which the part 10 is secured to the engine block or other suitable support, are equi-spaced, and for the same reason the outlet pipe may be made to extend perpendicularly either up or down, according to the manner in which it is initially installed, for the screw holes 12 by means of which the two parts 10 and 11 are secured together, are also equi-spaced and the clamping ring 27 and seat 32 are in all positions concentric.

The filtering band 20 may be of any suitable construction or type. It may be a fine wire mesh as shown in Figs. 1 to 3, or it may comprise a coarser wire mesh on which is superposed a sheet of filter paper or the like, or it may be fabric, as shown in Fig. 4.

Variations and modifications may be made within the scope of this invention and portions of the improvements may be used without others.

Having thus described the invention, what is claimed as new and for which it is desired to obtain Letters Patent, is:—

1. An oil filtering device comprising a frame having an inlet chamber and an outlet chamber adjacent thereto but spaced therefrom in fixed relation, said chambers having aligned apertures; a filtering band of indefinite length movable in the space between said chambers across said aligned apertures; and means for moving an apertured wall of one of said chambers without disturbing the fixed relation of the chambers toward and from an apertured wall of the other of said chambers to clamp the filtering band in intercepting relation between said chambers and release the same for movement respectively.

2. An oil filtering device comprising a frame having an inlet chamber and an outlet chamber adjacent thereto but spaced therefrom in fixed relation, said chambers having aligned apertures; a filtering strip located in the space between said chambers and in intercepting relation to said aligned apertures; and means for moving an apertured wall of one of said chambers toward and from an apertured wall of the other of said chambers without disturbing the fixed relation of the chambers to clamp the filtering strip in intercepting relation between said chambers and to release the same.

3. An oil filtering device comprising an inlet chamber and an outlet chamber in fixed relation adjacent thereto but spaced therefrom, said chambers having aligned apertures; a filtering band of indefinite length movable in the space between said chambers across said aligned apertures; and means for closing the space between the chambers and for clamping the filtering band in intercepting relation between said chambers without changing the fixed relation of the chambers.

4. An oil filtering device comprising a frame; an inclosed inlet compartment at one side of the frame; an inclosed outlet compartment at the other side of the frame, said inclosed compartments having adjacent aligned apertures and being spaced from each other; a filtering band of indefinite length located in blocking relation to said aligned apertures of the inlet and outlet chambers; means for mounting the used and unused portion of said filtering band exteriorly of said compartments; and other means adapted to clamp the strip in intercepting relation and providing a leak-proof connection between the spaced compartments.

5. An oil filtering device comprising an inlet chamber and an outlet chamber adjacent thereto but spaced therefrom, said chambers having adjacent walls provided with aligned apertures, one of said apertured walls being flexible and having a seat movable toward the other apertured wall and a filtering element located between said walls.

6. An oil filtering device comprising an inlet chamber and an outlet chamber adjacent thereto but spaced therefrom, said chambers having adjacent walls provided with aligned apertures, one of said apertured walls being flexible and having a seat movable toward the other apertured wall; and a filtering band of indefinite length movable in the space between said chambers and in intercepting relation with said movable seat and the adjacent wall of the other chamber.

7. An oil filtering device comprising an inlet chamber and an outlet chamber adjacent thereto but spaced therefrom, said chambers having adjacent walls provided with aligned apertures, one of said apertured walls being flexible and having a seat movable toward the other apertured wall; a filtering band of indefinite length movable in the space between said chambers and in intercepting relation with said movable seat and the adjacent wall of the other chamber; and means for moving the seat toward the adjacent apertured wall of the other chamber to clamp the filtering band therebetween.

8. An oil filtering device comprising an inlet chamber and an outlet chamber adjacent thereto but spaced therefrom, said chambers having adjacent walls provided with aligned apertures, one of said apertured walls being flexible and having a seat movable toward the other apertured wall; a filtering band of indefinite length movable in the space between said chambers and in intercepting relation with said movable seat and the adjacent wall of the other chamber; and a screw for moving said seat toward the adjacent apertured wall of the other chamber to clamp the filtering band therebetween.

9. An oil filtering device comprising an inlet chamber and an outlet chamber adjacent thereto but spaced therefrom in fixed relation, said chambers each having aligned cavities, and adapted to permit the free passage of a filtering band therebetween; and movable oil guiding means associated with one of said fixed chambers for clamping the filtering band to the other of said chambers and to close the space and provide a leak-proof connection between the two chambers.

10. An oil filtering device comprising a pair of chambers in fixed relation, one having a large aperture and the other having a small aperture adjacent thereto, said chambers being spaced from each other and adapted to permit the free passage of an oil filtering band of indefinite length therebetween; an oil guiding collar supported in said large apertured chamber for mechanical movement toward and from the other chamber and adapted to clamp the filtering band to the latter; and yielding means between the fixed chamber and the movable guide means for locating and supporting the latter and to insure a leak-proof connection between side walls of the large apertured chamber and the oil guiding means.

11. An oil filtering device comprising a main chamber; a secondary chamber adjacent the main chamber and in fixed spaced relation thereto; and yielding means associated with the secondary chamber adapted to open and close the space therebetween and to clamp a filtering strip when moved to closed position.

JOSEPH H. COHEN.